United States Patent Office 2,847,439
Patented Aug. 12, 1958

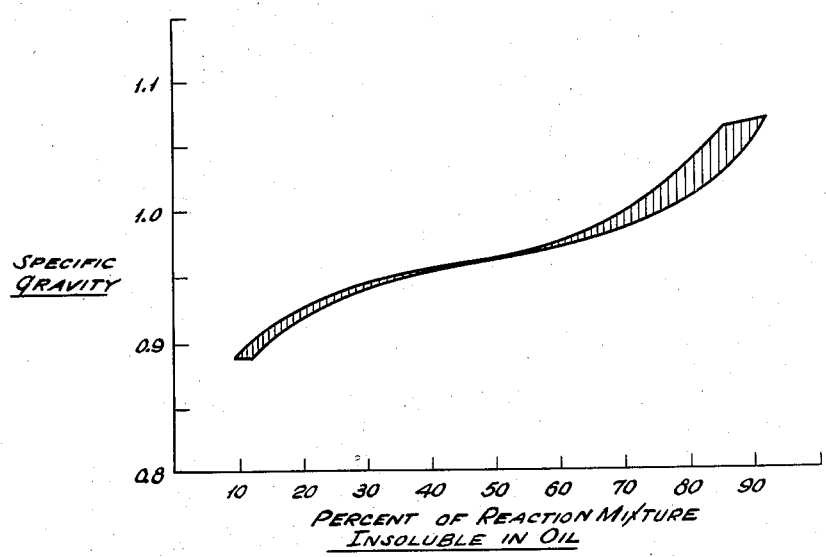

2,847,439
PROCESS FOR PRODUCING OIL-INSOLUBLE MATERIALS

George B. Kirkwood and Edward F. Twieg, Port Arthur, Tex., assignors to The Texas Company, New York, N. Y., a corporation of Delaware Application April 7, 1955, Serial No. 499,937

2 Claims. (Cl. 260—451)

This invention relates to a process for converting macrocrystalline paraffin wax by oxidation into a material of high insolubility in liquid hydrocarbons. The products of our invention are heavy, viscous and oil-resistant. They are useful in the formulation of seaming and slushing compositions.

The oxidation of wax is highly exothermic and is frequently difficult to control to obtain product uniformity, particularly when oxidizing the wax to a state of high oil insolubility. Heretofore in such oxidation it has been proposed to use waxes of low oil content and to use multiple stage treatment involving partial oxidation, separation of unreacted wax, and intensive oxidation of the remainder.

We now have found that paraffin wax can be converted with unexpectedly good reproducibility into a material of high insolubility in liquid hydrocarbons by a direct procedure providing that certain operating conditions are observed and that the wax used has a high oil content.

The charge macrocrystalline paraffin wax for use in our process should have from about 7 to 25% and preferably 9 to 20% oil as determined by testing procedure D721–53T given on pages 309–317 of the A. S. T. M. Standards on Petroleum Products and Lubricants (1953), published by the American Society for Testing Materials, 1916 Race Street, Philadelphia 3, Pennsylvania. Wax concentrates suitable for use in our invention are generally termed "slack waxes" in the trade and are considerably cheaper than refined waxes. The paraffin wax fraction of typical slack waxes as measured by the above test is a predominantly straight chain macrocrystalline substance having from about 20 to 32 carbon atoms per molecule.

Our process comprises forming a reaction mixture of such slack wax and metalliferous oxidation catalyst therefor; and, under pressure of at least 30 p. s. i. g. and at temperature between 300° and 380° F., oxidizing said reaction mixture to specific gravity between about 1.02 and about 1.08 with a gas containing molecular oxygen as the sole gasiform oxidizing agent therein.

Advantages of our process over previously proposed processes are: a simple single stage operation without preliminary wax deoiling treatments or intermediate separative treatments; a very high rate of formation of oil-insoluble compounds, e. g., reaction time of 3 to 5 hours is adequate to make a product of greater than 70% oil insolubility; and ease of process control using conventional equipment. Use of a wax charge having a flash point of 400° F. or higher reduces danger of flash fire, thus advantage of such charge material is clear.

The drawing shows the course of the oxidation reaction in a number of typical runs operated in accordance with the invention principles. Plots for the runs of specific gravity, increasing with reaction time, against increasing insolubility of the reaction product in hydrocarbon oil are superimposed. In particular the drawing shows an unexpected sharp increase in the specific gravity of the reaction mixture with respect to increase in oil insolubility thereof as the value of the specific gravity rises above 1. A tailing off of increase in oil-insoluble fraction and substantial degradation of the reaction mixture, accompanied by loss of yield, occurs as specific gravity reaches about 1.08.

Oil insolubility of reaction mixture indicated in the drawing is measured by the following test: 50 ml. of reaction product at 200° F. and sufficient of a refined distillate from paraffin base crude to make up 100 ml. total are thoroughly mixed in a 100 ml. graduated cylinder. The mixture is allowed to stand 24 hours at room temperature. At the end of the settling period an insoluble fraction of reaction mixture separates to the bottom of the graduate and is read in milliliters. The number of milliliters of the settled insoluble fraction times 2 is the percent hydrocarbon oil insoluble in the reaction mixture. All oil insolubility values used in this application are referred to the above testing procedure. The refined distillate used has viscosity (S. U. S. at 100° F.) of 182, flash point (C. O. C.) of 405, pour point of 0° F. and viscosity index of 91. (In place of the reference distillate one may use various grades of naphtha such as one having an end boiling point of about 200° F. or higher without substantially affecting test results.)

Metalliferous oxidation catalysts suitable for use in our process are potassium permanganate, manganese dioxide promoted with an organic acid, polyvalent metal soaps, potassium dichromate, or mixtures of these catalysts. These catalysts are not susceptible to loss in vapor phase; they are stable and non-corrosive in storage; and they do not tend to cause violent local reaction with foaming and other dangers to equipment and personnel if used by mistake in substantially excessive doses. We have found that catalyst concentration substantially below about 0.3 weight percent based on the weight of wax charged to the reactor system tends to give somewhat erratic results in our process. The preferred catalyst for our operation is potassium permanganate used in concentration of about 0.4% by weight of the wax charge. While higher concentrations, say 0.8% or more, can be used without hazard in the operation, there is no particular benefit obtained by using such concentrations, and for efficiency and economy catalyst concentration should be limited to about 0.6 weight percent.

The instant process proceeds at unexpectedly high rate using an oxidizing gas containing molecular oxygen as the sole gasiform oxidizing agent therein. No other oxidizing assistant such as nitric oxide, chlorine, or hydrogen peroxide (which, of course, is volatile or acts to release nascent oxygen under reaction conditions) is required, and attendant noxious fumes, storage instability, corrosiveness, and hazard in handling such volatile agents is eliminated.

For efficiency and economy in the practice of our process air is the preferred gasiform oxidizing agent. Oxygen-enriched air can also be used with effectiveness, but temperature control of the reaction becomes more delicate as oxygen concentration is increased. Air may be preheated, e. g. to reaction temperature, if desired. Time of air feed generally should be at least about 3 hours and preferably about 4–6 hours for obtaining the highly oxidized product. At the end of the air feed period inert gases such as nitrogen, carbon dioxide, flue gases, or steam can be introduced into the hot reaction mixture to drive off some volatile reaction components.

Superatmospheric pressure of at least 30 p. s. i. g. is a necessary condition in our process to secure rapid formation of the highly oil-insoluble reaction products. Pressure between 50 and 200 p. s. i. g. is advantageous and preferably, for efficiency and economy in the practice of our process, pressures from about 60 to 100 p. s. i. g. are used.

At a temperature substantially below about 300° F. conversion of the wax to oil-insoluble products is slow and often largely incomplete, even when using elevated pressure and a high catlyst concentration. Above about 380° F. degradation and carbonization of the wax is apt to occur and the danger of flash fires is increased. Advantageously reaction temperature is from 310 to 340° F. and preferable temperature of about 330° F. is employed. Temperature control in the reaction mixture is mostly conveniently obtained by use of water cooling coils submerged therein.

Use of a tall slender reactor with air inlet at the bottom is preferred. We have found it efficient and economical to use a reactor having height to diameter ratio of between about 8-10 and containing no packing or similar obstructions to air flow other than cooling coils for temperature control. Mechanical agitation may be used in the course of the reaction but is not necessary if the superficial velocity of the air being passed through the reaction mixture from bottom to top is maintained between about 0.25 and 1.0 and preferably at about 0.5 feet per second. By superficial velocity of the air feed, we mean the quotient of the expression (cubic feet per second of air feed measured at 60° F. and reactor inlet pressure:cross section of the empty reactor in square feet).

Distillate from the oxidation operation can be collected and used as a solvent or paint remover, or treated to yield various valuable oxygenated organic materials as by-products.

Operation of our process is done most simply batchwise in a single vessel. It is possible, however, to adapt the process to continuous operation, e. g. using a series of reaction vessels and introducing air into said vessels counterflow to the reaction mixture traveling through the system. Corrosion resistant materials of construction such as aluminum are preferred, but steel vessels are satisfactory for the process.

The following examples show ways in which our invention has been practiced but are not to be construed as limiting the invention. All temperatures are in degrees Fahrenheit, all pressures are in pounds per square inch gauge, all percentages except oil insolubility, described hereinbefore, are weight percentages, and all parts are parts by weight.

*Example 1.*—The reproducibility of results from our process and high rate of oxidation obtained therein are shown in data from two experimental runs described below wherein slack wax compositions were used as initial batch charge material. Each batch was oxidized in a vertical cylindrical reaction vessel by blowing with air from the bottom of the vessel for 5 hours. Reaction temperature was maintained at 330° and reaction pressure at 65. Catalyst concentration was 0.4% potassium permanganate based on the weight of slack wax charged. Air was fed to the reactor to obtain superficial air velocity of 0.55 feet per second in the reaction vessel. Charge slack wax analysis was as follows:

|  | Batch I | Batch II |
|---|---|---|
| Flash Point, °F. (Cleveland Open Cup) | 430 | 410 |
| Fire Point, °F. (Cleveland Open Cup) | 475 | 470 |
| Viscosity, S. U. S., 210°F | 38.6 | 38.5 |
| Oil Content, Percent | 11.9 | 13.1 |

The products had the following properties:

|  | Batch I | Batch II |
|---|---|---|
| Neut. Number | 192 | 193 |
| Sap. Number | 418 | 412 |
| Unsaponifiable, Percent | 6.7 | 5.9 |
| Specific gravity 60°/60° | 1.074 | 1.076 |
| Ash, Percent | 0.23 | 0.32 |
| Oil Insoluble, Percent | 95 | 94 |
| Acid value/saponification value | .460 | .468 |
| Yield, Percent (based on charge wax weight) | 62 | 68 |

*Example 2.*—2998 parts slack wax having specific gravity of 0.8251, 17% oil content, and flash point above 400° F. and 12 parts potassium permanganate dispersed therein were blown with 3060 parts per hour air in a vertical cylindrical reaction vessel for 5 hours. Temperature of the reaction mixture were maintained at 330° and pressure thereover at 65. Superficial air velocity in the reaction vessel was 0.49 feet per second.

The product had the following properties:

| | |
|---|---|
| Neut. number | 221 |
| Sap. number | 428 |
| Unsaponifiable, percent | 6 |
| Acid value/saponification value | 0.516 |
| Yield percent based on charge wax weight | 70 |
| Specific gravity 60°/60° | 1.053 |
| Ash, percent | 0.88 |
| Viscosity, S. U. S. at 210° F. | 167.7 |
| Oil insoluble, percent | 90 |

Obviously many modifications and variations of the invention, as hereinbefore set forth, may be made without departing from the spirit and scope thereof, and therefore only such limitations should be imposed as are indicated in the appended claims.

We claim:

1. A direct process for converting macrocrystalline paraffin wax into an oxidate more than 70% insoluble in liquid hydrocarbons which comprises: forming a reaction mixture of slack wax of 7 to 25% oil content and 0.3% to 0.8% metalliferous oxidation catalyst based on the weight of said wax; for about 3 to 6 hours passing through the reaction mixture a gas containing molecular oxygen as the sole gasiform oxidizing agent therein at a superficial velocity of 0.25 to 1.0 feet per second while maintaining a temperature between 300° and 380° F. and a pressure of at least 30 p. s. i. g.; and terminating the oxidation reaction when the specific gravity of the reaction mixture reaches between about 1.02 and about 1.08.

2. The process of claim 1 wherein the catalyst is potassium permanganate in concentration of about 0.4%, the slack wax has 9-20% oil content, the pressure used is 60-100 p. s. i. g., the temperature used is about 330° F., the oxidizing gas is air, the oxidizing gas velocity used is about 0.5 feet per second, and the oxidation reaction is terminated when the specific gravity of the reaction mixture is about 1.05.

References Cited in the file of this patent

UNITED STATES PATENTS

| | | |
|---|---|---|
| 2,637,695 | McKinley et al. | May 5, 1953 |
| 2,674,613 | Nelson | Apr. 8, 1954 |
| 2,681,357 | McKinley | June 15, 1954 |
| 2,705,241 | McKinley et al. | Mar. 29, 1955 |